United States Patent
Hatchman et al.

(10) Patent No.: US 10,293,279 B2
(45) Date of Patent: May 21, 2019

(54) FOAM CONTROL FORMULATIONS

(71) Applicant: RHODIA OPERATIONS, Paris (FR)

(72) Inventors: Kevan Hatchman, Yorkshire (GB); Gareth Collins, West Midlands (GB); Chris Jones, Staffordshire (GB)

(73) Assignee: RHODIA OPERATIONS, Paris (FR)

(*) Notice: Subject to any disclaimer, the term of this patent is extended or adjusted under 35 U.S.C. 154(b) by 647 days.

(21) Appl. No.: 14/399,342

(22) PCT Filed: May 10, 2013

(86) PCT No.: PCT/EP2013/059729
§ 371 (c)(1),
(2) Date: Nov. 6, 2014

(87) PCT Pub. No.: WO2013/167736
PCT Pub. Date: Nov. 14, 2013

(65) Prior Publication Data
US 2015/0080273 A1 Mar. 19, 2015

(30) Foreign Application Priority Data
May 10, 2012 (GB) .................................. 1208238.4

(51) Int. Cl.
*B01D 19/04* (2006.01)
*C09K 8/035* (2006.01)
*C10G 33/04* (2006.01)
*D21H 21/12* (2006.01)
*D21C 3/28* (2006.01)

(52) U.S. Cl.
CPC ......... *B01D 19/04* (2013.01); *B01D 19/0404* (2013.01); *C09K 8/035* (2013.01); *C10G 33/04* (2013.01); *D21C 3/28* (2013.01); *D21H 21/12* (2013.01)

(58) Field of Classification Search
CPC .... B01D 19/04; B01D 19/0404; C09K 8/035; C10G 33/04; D21H 21/12; D21C 3/28
USPC ........... 516/21, 27, 28, 29, 73, 74, 133, 134; 507/219, 260
See application file for complete search history.

(56) References Cited

U.S. PATENT DOCUMENTS

| | | | |
|---|---|---|---|
| 3,893,941 A | 7/1975 | Michalski et al. | |
| 4,208,301 A * | 6/1980 | Gammon | B01D 19/0409 162/173 |
| 4,946,625 A | 8/1990 | O'Lenick, Jr. | |
| 4,960,540 A | 10/1990 | Friel, Jr. et al. | |
| 5,167,281 A * | 12/1992 | Kalfoglou | C09K 8/584 166/270.1 |
| 5,320,777 A * | 6/1994 | Nguyen | B01D 19/0404 162/158 |
| 5,562,862 A | 10/1996 | Berzansky et al. | |
| 5,700,351 A | 12/1997 | Schuhmacher et al. | |
| 5,854,193 A | 12/1998 | Mondin et al. | |
| 6,148,932 A * | 11/2000 | Argillier | C09K 8/38 166/312 |
| 6,581,687 B2 * | 6/2003 | Collins | C09K 8/36 166/263 |
| 2003/0166472 A1 | 9/2003 | Pursley et al. | |
| 2004/0171504 A1 | 9/2004 | Clarke et al. | |
| 2006/0135683 A1 | 6/2006 | Adam et al. | |
| 2009/0281012 A1 * | 11/2009 | Trivedi | C08G 65/3314 510/138 |
| 2010/0047296 A1 * | 2/2010 | Banowski | A61K 8/0229 424/401 |
| 2015/0010429 A1 * | 1/2015 | Hatchman | C11D 11/0041 422/12 |

FOREIGN PATENT DOCUMENTS

EP 0007056 A1 1/1980
WO WO 2009/023724 A2 2/2009

* cited by examiner

Primary Examiner — Daniel S Metzmaier

(57) ABSTRACT

The invention provides a foam control formulation in the form of a microemulsion, the formulation comprising: (a) from 5 to 70% w/w of primary surfactant, this surfactant having an HLB of from 1 to 12 and/or a cloud point of from 20 to 70° C.; (b) from 2 to 40% w/w of water-insoluble organic carrier liquid; and (c) water. Also provided is the use of this formulation to prevent and/or reduce foam in a fluid system, or as a processing aid to control foam production in a fluid system. The formulation may be used in an aqueous fluid system, such as an oilfield.

19 Claims, No Drawings

FOAM CONTROL FORMULATIONS

CROSS-REFERENCE TO RELATED APPLICATIONS

The present application is a U.S. national stage entry under 35 U.S.C. § 371 of International Application No. PCT/EP2013/059729 filed May 10, 2013, which claims priority to GB Application No. 1208238.4 filed on May 10, 2012, the whole content of this application being herein incorporated by reference for all purposes.

The present invention relates to foam control formulations for preventing or reducing foam, and to the use of such formulations to prevent or reduce foam in fluid environments, such as aqueous fluid environments, and especially those in oilfield applications.

BACKGROUND TO THE INVENTION

Defoamer formulations are widely used in industrial applications to control foam produced by mechanical agitation or shearing of fluids. They may be comprised of low viscosity oils, polyols and low foam surfactants. Commercial defoamer formulations may also contain hydrophobic particles to break the foam, by adsorbing to the air/liquid interface and changing the contact angle.

Defoamer compositions containing hydrophobic particulates (such as hydrophobically modified silica or fatty acid amides, e.g. behenamide and diamides) often require complex processing, whereby the waxy material has to be melted and then cooled to produce solid in the oil phase with the appropriate particle size distribution. A major drawback of these defoamers is the separation of the particulates from the formulation, which may result in the particulates depositing in an unwanted manner. In particular, there may end up being unwanted deposits on equipment surfaces or blockages of injection lines or filters. This may necessitate costly clean up operations.

Silicone antifoam/defoamer formulations are an important group of foam control systems; these include polydimethylsiloxane/silica dispersions and the like. They are commercially available as O/W (oil in water) or W/O (water in oil) emulsions. They are primarily used to suppress the production of foam in applications such as laundry detergents, pulp and paper (particulate stabilized foams), mineral processing, food processing (proteinous foams), agrochemicals and oilfield applications. Although the use of silicone antifoams is widespread in oilfield applications, there are instances where their use may be prohibitive owing to the potential risk of downstream production problems. A particular area of concern is the refining of petroleum where the presence of silicone antifoams may cause catalyst poisoning or contamination of products such as fuels. As a consequence of these problems their use has been restricted in oilfield production facilities in recent years. Silicone antifoams have additional drawbacks such as the deterioration in their efficiency in highly alkaline media as a result of hydrolysis, which is relevant in applications such as pulp and paper processing.

Defoamer formulations that are free of silicone are also used, but they also have practical limitations. They are either O/W or W/O emulsions comprised of low foam surfactants (e.g. EO/PO block copolymers), hydrophobic particles, mineral oils, paraffinic (e.g. white oils), vegetable and synthetic oils (e.g. esters). They may suffer from instability at low or high temperature (creaming) and may form thick pastes or creams which are difficult to pump. Compositions based on low foam nonionic surfactants rely on the cloud point of the amphiphiles in aqueous solution for their mode of action. The surfactant is insoluble above its cloud point and behaves as an antifoam particle. Below the cloud point the surfactants are soluble in the aqueous media and therefore are considered to be non-depositing. This is described in, for example, U.S. Pat. Nos. 4,946,625 and 4,960,540.

Foams generated in oilfield production lines are complex dispersions consisting of solid particulates (asphaltenes, paraffin waxes, scales, e.g. alkali metal carbonates or iron sulfide, rust and sands), surface active components (natural resins, napthenate soaps, corrosion inhibitors, proteins), brine and hydrocarbons. The complexity of the foams makes it is difficult to control the volume produced by the release of volatile hydrocarbons in the separators. Therefore more effective defoamer systems are needed.

SUMMARY OF THE INVENTION

The present invention provides, in a first aspect, a foam control formulation in the form of an emulsion, the formulation comprising:
(a) from 5 to 70% w/w of primary surfactant, this surfactant having an HLB of from 1 to 12, and a cloud point of from 20 to 70° C.;
(b) from 2 to 40% w/w of water-insoluble organic carrier liquid; and
(c) water.

The present invention provides, in a second aspect, a precursor to a foam control formulation in the form of an emulsion, the precursor comprising:
(a) primary surfactant, this surfactant having an HLB of from 1 to 12 and a cloud point of from 20 to 70° C.; and
(b) water-insoluble organic carrier liquid.

The present invention provides, in a third aspect, a method of preparing a foam control formulation in the form of an emulsion, the method comprising:
(a) providing a primary surfactant, this surfactant having an HLB of from 1 to 12 and a cloud point of from 20 to 70° C.;
(b) providing a water-insoluble organic carrier liquid;
(c) combining the primary surfactant and water-insoluble organic carrier liquid with water and mixing or stirring to provide a formulation in the form of an emulsion.

The present invention provides, in a fourth aspect, a method of preventing or reducing foam in a fluid environment, the method comprising:
(a) providing a formulation according to the first aspect of the invention; and
(b) adding the formulation to the fluid environment.

The method may prevent the formation of foam (antifoam) and/or may reduce the levels of foam that already exist (de-foam). The formation of foam may be fully or partly prevented. Any levels of foam that already exist may be reduced to a lower level by any percentage; it may be that the reduction is by 100% such that foam levels become zero or it may be that the percentage reduction is less than 100%, e.g. from 1 to 99%.

A benefit of the present invention is the ability of the formulations to initially reduce the levels of foam that already exist and to then also prevent (or limit) further foam formation. In situations where there is significant agitation a problem with some defoamers is that although they reduce the foam levels they do not prevent (or limit) further foam forming in the agitated environment.

The present invention provides, in a fifth aspect, the use of a formulation according to the first aspect of the invention to prevent and/or reduce foam in a fluid system, such as an aqueous fluid system. It may be that the formulation is used to (partially or fully) reduce foam in a fluid system and to then (partially or fully) prevent further foam formation in the system.

The present invention provides, in a sixth aspect, the use of a formulation according to the first aspect of the invention as a processing aid to control foam production in a fluid system, especially in a system where there is a high degree of agitation.

In particular, the formulations may be used in an oilfield system, e.g. an oilfield production system.

In the present invention, the water-insoluble organic carrier liquid suitably comprises a viscosity modifier selected from: dibasic acid esters, fatty acid esters and mixtures thereof. This permits the formulation to be provided as a stable and readily usable formulation that is a very effective defoamer and a good antifoamer. The presence of one or more dibasic acid ester and/or fatty acid ester serves to improve solvency and solubilisation with the surfactant system. As discussed below in more detail, the use of these esters enhances the defoaming performance of the hydrophobic phase due to the spreading properties of these esters at the gas/liquid interface.

The primary surfactant is, in general, a surfactant having an HLB of from 1 to 12, and a cloud point of from 20 to 70° C. However, the skilled reader will appreciate that not all surfactants exhibit a cloud point. The primary surfactant is, therefore, in some embodiments, a surfactant having an HLB of from 1 to 12, and that does not have a cloud point.

It may be that the primary surfactant is a surfactant having an HLB of from 1 to 12 and/or having a cloud point of from 20 to 70° C.

It may be that the primary surfactant is a surfactant having an HLB of from 1 to 12, wherein in the event that this surfactant has a cloud point, the cloud point is from 20 to 70° C.

In one embodiment, the primary surfactant is an alkoxylated surfactant, which will therefore have a cloud point. In this case it is desired that the surfactant has an HLB of from 1 to 12, and a cloud point of from 20 to 70° C.

In another embodiment, the primary surfactant is not an alkoxylated surfactant, which does not have a cloud point. In this case it is desired that the surfactant has an HLB of from 1 to 12.

In the present invention, the foam control formulation is suitably in the form of a microemulsion. The use of a microemulsion system is beneficial because it is thermodynamically stable, which means it is at its lowest energy state, in contrast to macroemulsions which are kinetically stable and therefore are liable to separate over time. Prior defoamer systems have used conventional emulsions, i.e. macroemulsions, or liquid formulations.

Microemulsions are macroscopically homogeneous dispersions of hydrophobic liquid (e.g. oil), water and surfactant. The dispersion may include one or more co-surfactant. The aqueous phase may contain one or more salt and/or one or more other ingredients. The hydrophobic liquid may be a single component (e.g. a vegetable oil or a mineral oil) or a mixture of components, e.g. it may be a complex mixture of hydrocarbons and/or olefins.

Microemulsions are highly dynamic systems with respect to their internal structure. The surfactant aggregates within the microemulsion are highly labile species. Properties of microemulsions are described in the book "Microemulsions Theory and Practice" (Leon M Prince, Academic Press Inc., NY, 1977).

The surfactant aggregates in a microemulsion typically have dimensions of the order of from 1 to 100 nm. This results in the formulation having a clear, slightly turbid or translucent appearance. This contrasts with particle size distributions for commercial defoamers, which are of the order of 0.1-20 microns, meaning that those defoamers tend to have an opaque, milky appearance.

The use of a microemulsion formulation is beneficial because it will be stable over a wide temperature range and will not easily separate into separate phases or settle out. Generally, the formulations of the invention will be stable not only at ambient temperature but also at higher temperatures, e.g. 40° C. and at lower temperatures, e.g. −20° C.

In addition, the microemulsion formulations have a low viscosity. The low viscosity characteristic is significant because viscous emulsions are difficult to inject into fluid environments and therefore are difficult to disperse effectively.

The microemulsions are also straightforward to manufacture. Microemulsions form upon simple mixing of the components. They can be easily prepared by gentle mixing or shaking and so their production generally requires only simple liquid blending facilities; this contrasts with the high shear mixing required in respect of macroemulsion production.

Due to the ease of manufacture, it is possible to prepare the formulations of the invention on site prior to use. For example, the components of the formulation (apart from the water) may be supplied to the site, either separately or as a blend, and then can be mixed or shaken with water on site to generate to the foam control formulation of the invention. In oilfield applications it can be envisaged that the water used in this regard could be seawater. Clearly a benefit of being able to generate the foam control formulation of the invention on site is that the volumes of product to be transported to the site and stored on site are reduced, and that the required quantities of product can be prepared as required shortly before use. In particular, the precursor of the second aspect of the invention may be supplied to the site and then can be mixed or shaken with water on site to generate to the foam control formulation of the invention.

The formulations of the invention are low viscosity dispersions and are stable over a wide temperature range compared to two commercial antifoams. The formulations have a clear or translucent appearance.

In summary, the major benefits of the microemulsion formulations of the invention are:
  they have a wide temperature stability range, especially compared to emulsions,
  they are low viscosity, permitting ease of dosing,
  they are easy to manufacture,
  they are unlikely to persist in downstream operations (e.g. refining),
  they are relatively benign to the environment (and the majority of the components in the formulations of the invention are biodegradable),
  they are non-depositing,
  it is relatively easy to adapt the formulations, to meet specific criteria for a given end use, whilst retaining the antifoaming/defoaming effect.

DETAILED DESCRIPTION OF THE INVENTION

The formulations of the present invention are stable and readily usable formulations which are very effective defoamers and good antifoamers. This contrasts with current products which, whilst effective at de-foaming and anti-foaming, present problems in terms of lack of stability and/or ability to be readily or widely used. Although micro-emulsions per se are well known, microemulsion de-foaming or anti-foaming formulations, e.g. for use in oilfield applications, are a new concept and contrast with the conventional emulsion and dispersion formulations previously used.

The formulations of the invention are water in oil (W/O) dispersions which when diluted in water (e.g. when added to the fluid system) will form oil in water (O/W) emulsions. They contain a primary surfactant that is relatively "low" foaming; this has the characteristics as defined below. The surfactant will phase separate from aqueous solution above its cloud point.

The primary surfactant used in the formulations of the invention suitably has an HLB (hydrophilic-lipophilic balance) value of from 1 to 12, such as from 1.5 to 11.5 or from 2 to 11; it may be that the HLB value is from 2 to 12, such as from 2 to 11 or from 3 to 11 or from 3 to 10.

The primary surfactant used in the formulations of the invention preferably has an HLB value of from 1 to 10, such as from 1.5 to 10. In a preferred embodiment the HLB value is from 2 to 10.

The skilled reader will appreciate that HLB values can be determined by the use of H-NMR, which allows a HLB value to be calculated by integration of the H-signals from the lipophilic and hydrophilic parts of the molecule. HLB values for surfactants are also known in the literature available in the skilled reader's common knowledge.

The use of low HLB value surfactants gives rise to the relatively "low" foaming property mentioned above.

The primary surfactant used in the formulations of the invention suitably has a cloud point in the range of from 20 to 70° C., such as from 25 to 65° C.; preferably the cloud point is in the range of from 20 to 60° C., such as from 25 to 55° C. or from 30 to 50° C. In one embodiment the cloud point is in the range of from 20 to 40° C., such as from 25 to 40° C. or from 30 to 40° C. Of course, as noted above, not all surfactants exhibit a cloud point and therefore for such surfactants it is immediately apparent to the skilled reader that this feature is not applicable and is not required.

The table below sets out examples of some surfactants that may be used in the invention and their HLB and cloud point values.

| Surfactant | HLB | Cloud Point (° C.) |
| --- | --- | --- |
| ALKAMULS S/20 (ex Solvay) Sorbitan Monolaurate | 8.6 | N/A |
| ALKAMULS S/80 (ex Solvay) Sorbitan Monooleate | 4.3 | N/A |
| ANTAROX 25-R-2 (ex Solvay) EO/PO block copolymer | * | 31-35 (1% aqueous solution) |
| RHODASURF DA 630/E Isodecyl ethoxylate | * | 39-45 (1% aqueous solution) |
| RHODOLINE HP (ex Solvay) Terpene alkoxylate | * | 32-39 (10% aqueous Butyl Diglycol solution) |
| Polyglyceryl-3 Ricinoleate | 4 | N/A |
| Polyglyceryl-3 Oleate | 5 | N/A |
| Polyglyceryl-4 Isostearate | 5 | N/A |
| PEG 600 Dioleate | 10 | N/A |

* in the range of 1-12

The skilled reader will appreciate that the cloud point (i.e. the temperature at which the material is no longer completely soluble in water, precipitating as a second phase and giving the fluid a cloudy appearance) can be determined using the cloud point test for nonionic surfactants (e.g. ASTM D2024-09).

The primary surfactant is used in an amount of from 5 to 70% w/w of the formulation, e.g. from 5 to 65% w/w. In one preferred embodiment, it is used in an amount of from 5 to 60% w/w.

In one embodiment the primary surfactant is used in an amount of from 5 to 60% w/w, e.g. from 5 to 59% w/w, such as from 6 to 58% w/w, or from 7 to 57% w/w, or from 8 to 56% w/w.

In one embodiment the primary surfactant is used in an amount of from 5 to 55% w/w, such as from 10 to 55% w/w, or from 15 to 50% w/w, or from 20 to 45% w/w.

The primary surfactant may be selected from fatty acids, alkoxylated alcohols (including fatty alcohol alkoxylates), terpene alcohols, alkoxylated terpenes, block copolymers of alkoxylates (including polyol, diamine and diamide derivatives thereof), fatty alkanolamides, fatty alkanolamines, carboxylic acid esters of alcohols, fatty acid esters of alcohols, including fatty acid mono and diesters of polyols (e.g. polyglyceryl or polyethylene glycol), sorbitan esters and ethoxylated sorbitan esters, alkoxylated fatty acids, alkyl polyglucosides, and fatty acid diamides, (e.g. MIRAMINE® ODO, which is a 2:1 adduct of oleic acid and ethylenediamine).

The primary surfactant may, for example, be selected from fatty acids, alkoxylated alcohols (including fatty alcohol alkoxylates), terpene alcohols, alkoxylated terpenes, block copolymers of alkoxylates (including polyol, diamine and diamide derivatives thereof), fatty alkanolamides, fatty alkanolamines, carboxylic acid esters of alcohols, fatty acid esters of alcohols, including fatty acid mono and diesters of polyols (e.g. polyglyceryl or polyethylene glycol), sorbitan esters, alkoxylated fatty acids, alkyl polyglucosides, and fatty acid diamides, (e.g. MIRAMINE® ODO, which is a 2:1 adduct of oleic acid and ethylenediamine).

The primary surfactant may, in one embodiment, be selected from alkoxylated alcohols, alkoxylated terpenes, block copolymers of alkoxylates, fatty alkanolamides, fatty alkanolamines, carboxylic acid esters of alcohols, fatty acid esters of alcohols, alkoxylated fatty acids, alkyl polyglucosides, fatty acid mono and diesters of polyols (e.g. polyglyceryl or polyethylene glycol) and fatty acid diamides, (e.g. MIRAMINE® ODO, which is a 2:1 adduct of oleic acid and ethylenediamine).

In one embodiment, the primary surfactant is selected from alkoxylated alcohols, alkoxylated terpenes, block copolymers of alkoxylates, and fatty acid esters of alcohols, including fatty acid mono and diesters of polyols.

In one embodiment, the primary surfactant is selected from fatty acid esters of alcohols (e.g. sorbitan esters of fatty acids, such as sorbitan monolaurate, polyglyceryl fatty acid esters, such as polyglyceryl-3 oleate, and polyethylene glycol fatty acid esters, such as PEG dioleate), fatty acids and fatty acid alkoxylates (e.g. fatty acid ethoxylates), block copolymers of alkoxylates (e.g. glycerol EO/PO block copolymers, EO/PO block copolymers, ethylene diamine EO/PO block copolymers), fatty alcohol alkoxylates, terpene alcohols (e.g. Nopol) and alkoxylated terpenes.

In one embodiment, the primary surfactant is selected from fatty acid esters of alcohols (e.g. sorbitan esters of fatty acids, such as sorbitan monolaurate, polyglyceryl fatty acid esters, such as polyglyceryl-3 oleate, and polyethylene glycol fatty acid esters, such as PEG dioleate), fatty acids and fatty acid alkoxylates (e.g. fatty acid ethoxylates), block copolymers of alkoxylates (e.g. glycerol EO/PO block copolymers, EO/PO block copolymers, ethylene diamine EO/PO block copolymers), and alkoxylated terpenes (e.g. a block alkoxylated C8-15 terpene, such as a block alkoxylated EO/PO C9 terpene).

In one embodiment, the primary surfactant is selected from fatty acid esters of alcohols (e.g. sorbitan esters of fatty acids, such as sorbitan monolaurate, polyglyceryl fatty acid esters, such as polyglyceryl-3 oleate, and polyethylene glycol fatty acid esters, such as PEG dioleate), fatty acid alkoxylates (e.g. fatty acid ethoxylates, such as isodecyl ethoxylate), block copolymers of alkoxylates (e.g. glycerol EO/PO block copolymers, EO/PO block copolymers, ethylene diamine EO/PO block copolymers), and alkoxylated terpenes (e.g. a block alkoxylated C8-15 terpene, such as a block alkoxylated EO/PO C9 terpene).

For alkoxylated products, the alkoxylating group may suitably be a C1-C4 alkoxy group, such as ethoxy, propoxy or butoxy, or combinations thereof. For example, the invention envisages, inter alia, ethoxylation, propoxylation, butoxylation, and block alkoxylation with (EO)(PO), (EO)(BO), (PO)(EO) and (BO)(EO). Preferably, the alkoxylating group is ethoxy, propoxy, (EO)(PO), or (PO)(EO).

For the alkoxylated products, the degree of alkoxylation is suitably from 1 to 50, such as from 1 to 40, e.g. from 1 to 30; preferably from 1 to 20 and most preferably from 1 to 15. In one embodiment, the degree of alkoxylation is 2, 3, 4, 5, 6, 7, 8, 9, 10, 11 or 12. The skilled reader will understand that alkoxylated products are generally present as mixtures where there are varying numbers of alkoxylation. Thus, when referring to alkoxylated products, the degree of alkoxylation is the average (mean) degree of alkoxylation of the mixture.

The alkoxylated alcohol may suitably be formed from the reaction of a C2-C20 alcohol and alkylene oxide(s), wherein the alcohol may preferably be a polyol and especially a sugar alcohol. The alcohol may, for example, be a C2-C20 polyol, preferably a C2-C12 polyol, e.g. a C3-C10 polyol, and most preferably a C3-C8 polyol, such as a C3, C4, C5 or C6 polyol. The polyol may, for example, be ethylene glycol, glycerol, propylene glycol, erythritol, threitol, ribitol, sorbitol, mannitol or galactitol.

The alkoxylated terpene may suitably be formed from the reaction of a C6-C30 terpene group and alkylene oxide(s), wherein the terpene group comprises a terpene radical that may be acyclic or cyclic; for example it may be a C8 to C30, C8 to C24, C8 to C22, C8 to C20, C8 to C16, or C9 to C15 terpene radical.

The terpene group may, in one embodiment, comprise a C8-C15 monocyclic or bicyclic terpene radical, and may optionally further comprise a C1-15 hydrocarbon linking group. In the alkoxylated terpene this linking group is a divalent hydrocarbon that links the terpene radical to the alkoxylating groups. This C1-20 hydrocarbon divalent linking group may suitably be a C1-20 alkylene, C2-20 alkenylene, or C1-20 alkoxyene group, for example a C1-12 alkylene, C2-12 alkenylene, or C1-12 alkoxyene group, such as a C2-10 alkylene, C2-10 alkenylene, or C2-10 alkoxyene group; preferably a C2-8 alkylene, C2-8 alkenylene, or C2-8 alkoxyene group; more preferably a C2, C3, C4, C5 or C6 alkylene or alkoxyene group; most preferably a C2, C3, or C4 alkylene or alkoxyene group.

In one embodiment the terpene radical comprises a bicyclo[a,b,c,]heptenyl or bicyclo[a,b,c]heptyl radical, wherein a+b+c=5 and a=2, 3, or 4; b=2 or 1; and c=0 or 1. Thus the terpene group may, for example, be of formula Z—Y in which Z represents a bicyclo[a,b,c]heptenyl or bicyclo[a,b,c]heptyl radical, wherein a+b+c=5 and a=2, 3, or 4; b=2 or 1; and c=0 or 1; and Y represents —CH$_2$—C(R$^0$)(R$^1$) or —O—CH(R$^2$)CH(R$^3$)—, wherein R$^0$, R$^1$, R$^2$, and R$^3$, which may be identical or different, represent hydrogen or a C1-8 (preferably C1-6 or C1-5) alkyl. Preferably, R$^0$, R$^1$, R$^2$, and R$^3$, which may be identical or different, represent hydrogen or a C1, C2, C3 or C4 alkyl. Most preferably R$^0$, R$^1$, R$^2$, and R$^3$, which may be identical or different, represent hydrogen or a C1 or C2 alkyl.

In one such embodiment, therefore, the alkoxylated terpene is of the following formula:

Z—Y—[OCH(R$^4$)—CH(R$^5$)]$_n$—[OCH$_2$CH$_2$]$_m$— in which Z represents a bicyclo[a,b,c]heptenyl or bicyclo[a,b,c]heptyl radical, wherein a+b+c=5 and a=2, 3, or 4; b=2 or 1; and c=0 or 1; Y represents CH$_2$—C(R$^0$)(R$^1$)— or —O—CH(R$^2$)—CH(R$^3$)—, wherein R$^0$, R$^1$, R$^2$, and R$^3$, which may be identical or different, represent hydrogen or a C1-8 (preferably C1-6 or C1-4, more preferably C1 or C2) alkyl; R$^4$ and R$^5$, which may be identical or different, represent hydrogen or a C1 or C2 alkyl, provided that at least one of the radicals R$^4$ and R$^5$ is not hydrogen and provided that the total number of carbon atoms in the radicals R$^4$ and R$^5$ is 1 or 2; n is an integer from 0 to 20; and m is an integer from 1 to 50.

This type of terpene product is, for example, described in US Patent Publication No: 2006/0135683 and in WO 2009/023724.

In one such embodiment, Z represents a bicyclo[a,b,c,]heptenyl or bicyclo[a,b,c]heptyl radical, wherein a+b+c=5 and a=2, 3, or 4; b=2 or 1; and c=0 or 1; Y represents —CH$_2$—CH$_2$— or —O—CH$_2$—CH$_2$—; R$^4$ and R$^5$, which may be identical or different, represent hydrogen, CH$_3$ or C$_2$H$_5$, provided that at least one of the radicals R$^4$ and R$^5$ is not hydrogen and provided that the total number of carbon atoms in the radicals R$^4$ and R$^5$ is 1 or 2; n is an integer from 1 to 20; and m is an integer from 1 to 20.

Preferably, in this embodiment the alkoxylated terpene is of the following formula:

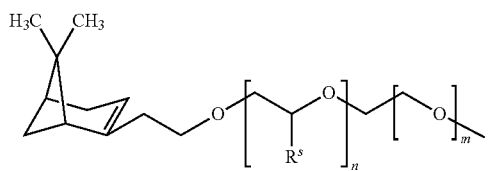

wherein R$^s$ is CH$_3$ or C$_2$H$_5$, n is an integer from 1 to 20 and m is an integer from 1 to 30. Most preferably, R$^s$ is CH$_3$, n is an integer from 1 to 20 and m is an integer from 1 to 20. For example, it may be that R$^s$ is CH$_3$, n is an integer from 1 to 10 and m is an integer from 1 to 10.

Accordingly, in one embodiment it is preferred that the alkoxylated terpene is a block alkoxylated terpene derived from 6,6-dimethylbicyclo[3.1.1]hept-2-ene-2-ethanol (CAS No: 128-50-7), especially a (PO)(EO) block alkoxylated terpene. In this embodiment, the number of propoxy groups is preferably from 1 to 20 (e.g. from 1 to 10) and the number of ethoxy groups is preferably from 1 to 20 (e.g. from 1 to 10). The HLB of the alkoxylated terpene is preferably less than 10, such as 5 or less; preferably from 1 to 5 and more preferably from 3 to 5.

In one embodiment the terpene alkoxylate may be a terpene (C9) block alkoxylated (EO)(PO) half ester sulfosuccinate where the terpene alkoxylate has an HLB in the range of from 3 to 5. (e.g. RHODOLINE HP ex Solvay).

The terpene alcohols that may be used are the same terpenes discussed above and terpene alcohols based on the terpene radicals discussed above.

The block copolymers of alkoxylates may be may suitably be block copolymers of two or more C1-C4 alkoxy groups, such as ethoxy, propoxy or butoxy. For example, the invention envisages, inter alia, the use of block copolymers that are selected from (EO)(PO), (EO)(BO), (PO)(EO) and (BO)(EO) block copolymers. Specific examples of block copolymers of alkoxylates that may be used include EO/PO block copolymers comprised of polypropylene glycol hydrophobes (which may have a weight average molecular weight Mw of from 100 to 600 Da) with from 1 to 30 moles EO and from 1 to 30 moles PO. Examples include ANTAROX® L64 (available from Solvay) or PLURIOL® PE 6400 (available from BASF).

The fatty acids, fatty acid esters of alcohols, fatty alkanolamides, fatty alkanolamines, fatty acid mono and diesters of polyols and fatty acid diamides include a "fatty" group. Such groups are known in the art.

In one embodiment, the "fatty" group may be a C8-30 unbranched or branched alkyl or alkenyl group, such as a C10-24 unbranched or branched alkyl or alkenyl group, or such as a C10-22 unbranched or branched alkyl or alkenyl group, or a C11-20 unbranched or branched alkyl or alkenyl group, e.g. a C12-18 unbranched or branched alkyl or alkenyl group.

In one embodiment, the "fatty" group is a C8-30 unbranched alkyl or alkenyl group, such as a C10-24 unbranched alkyl or alkenyl group, or such as a C10-22 unbranched alkyl or alkenyl group, or a C11-20 unbranched alkyl or alkenyl group, e.g. a C12-18 unbranched alkyl or alkenyl group. In some embodiments, the "fatty" group may be a C10-24 unbranched alkyl or alkenyl group. In some embodiments, the "fatty" group may be a C12-24 unbranched alkyl or alkenyl group.

In relation to these fatty acids, fatty alkanolamides, fatty alkanolamines, fatty acid mono and diesters of polyols and fatty acid diamides, the following features also apply. The amide may suitably be a monoamide or diamide and may suitably be a C1-12 amide, e.g. C1-8 or C2-6, e.g. C3, C4 or C5. The amine may suitably be a monoamine or diamine and may suitably be a C1-12 amine, e.g. C1-8 or C2-6, e.g. C3, C4 or C5. The polyols may be a polymer of a C2-C20 alcohol, preferably of a C2-C12 alcohol, e.g. a C3-C10 alcohol, and most preferably a C3-C8 alcohol, such as a C3, C4, C5 or C6 alcohol. The polyol may, for example, be polyglyceryl or polyethylene glycol. The polyol may have a weight average molecular weight Mw in the range of from 50 to 1000 Da, such as from 100 to 600 Da. In one embodiment, the polyol may be a polyglyceryl with from 3 to 12 glyceryl units, e.g. 3, 4 or 5. In another embodiment, the polyol may be a polyethylene glycol with a weight average molecular weight Mw in the range of from 100 to 800 Da. The diamides may be a C1-12 diamide, e.g. C1-8 or C2-6, e.g. C2, C3, C4 or C5. An example of a fatty acid diamide is MIRAMINE® ODO, which is a 2:1 adduct of oleic acid and ethylenediamine.

In relation to the fatty acid esters of alcohols, these alcohols may be polyols or may be monoalcohols. The polyols may, as noted above, be polymers of alcohols, or they may be other alcohols having multiple hydroxyl groups, e.g. sugar alcohols. It may be that the alcohol is a C2-18 polyol, such as a C2-12 polyol or a C3-10 polyol or a C3-8 polyol, for example selected from glycerol, erythritol, threitol, ribitol, sorbitol, sorbitan, mannitol or galactitol.

In one embodiment, in relation to the fatty acid esters of alcohols, the alcohol is sorbitan, polyglycerol, or polyethylene glycol.

The carboxylic acid esters of alcohols may suitably be the reaction product of a C1-8 carboxylic acid with a C2-C20 alcohol. The alcohol may, for example, be a C2-C20 alcohol, preferably a C2-C12 alcohol, e.g. a C3-C10 alcohol, and most preferably a C3-C8 alcohol, such as a C3, C4, C5 or C6 alcohol. The carboxylic acid may be a C1-8 carboxylic acid, such as a C1-6 carboxylic acid, e.g. a C2-6 carboxylic acid.

In one embodiment the carboxylic acid esters of alcohols are the reaction product of a C1-8 monocarboxylic acid with a C2-C20 polyol wherein the alcohol may optionally be a sugar alcohol. It may be that the alcohol is a C2-10 polyol, such as a C3-C8 polyol or a C3-6 polyol, for example selected from ethylene glycol, propylene glycol, glycerol, erythritol, threitol, ribitol, sorbitol, mannitol or galactitol. It may be that the carboxylic acid is a C1-6 monocarboxylic acid, e.g. a C1-4 monocarboxylic acid, such as formic acid, acetic acid or propionic acid.

In one embodiment, the carboxylic acid esters of alcohols are the reaction product of a C1-8 dicarboxylic acid with a C2-C20 monoalcohol. It may be that the alcohol is a C1-10 monoalcohol, such as a C1-C6 monoalcohol, e.g. methanol, ethanol or propanol. It may be that the carboxylic acid is a C2-8 dicarboxylic acid, e.g. a C2-6 dicarboxylic acid, such as oxalic acid, malonic acid, succinic acid or glutaric acid The fatty acid esters of alcohols may suitably be the reaction product of a C8-30 fatty acid with a C2-C20 alcohol. The fatty acid esters of alcohols may suitably be diesters or triesters. The alcohol may be a C2-C20 polyol wherein the alcohol may optionally be a sugar alcohol. It may be that the alcohol is a C2-10 polyol, such as a C3-C8 polyol or a C3-6 polyol, for example selected from ethylene glycol, propylene glycol, glycerol, erythritol, threitol, ribitol, sorbitol, mannitol or galactitol. The fatty acid may be of formula $R^f$—OH where $R^f$ is a C8-30 unbranched alkyl or alkenyl group, such as a C10-22 unbranched alkyl or alkenyl group, or a C11-20 unbranched alkyl or alkenyl group, e.g. a C12-18 unbranched alkyl or alkenyl group. In some embodiments, the $R^f$ group may be a C12-24 unbranched alkyl or alkenyl group.

The alkoxylated fatty acids may suitably be formed from the reaction of a C8-30 fatty acid and alkylene oxide(s). The fatty acid may be of formula $R^f$—OH where $R^f$ is a C8-30 unbranched alkyl or alkenyl group, such as a C10-22 unbranched alkyl or alkenyl group, or a C11-20 unbranched alkyl or alkenyl group, e.g. a C12-18 unbranched alkyl or alkenyl group. In some embodiments, the $R^f$ group may be a C12-24 unbranched alkyl or alkenyl group.

The alkyl polyglucoside may suitably have an alkyl group that is a C1 to 24 branched or unbranched alkyl group, such as a C1 to C20, C2 to C18, or C2 to C16 branched or unbranched alkyl group; in one preferred embodiment it may be a C1 to C12 branched or unbranched alkyl group, such as a C1 to C10, C1 to C8, C1 to C6, or C2 to C6 branched or unbranched alkyl group, e.g. a C3, C4 or C5 branched or unbranched alkyl group. Preferably the alkyl group is a C4 to 10 branched or unbranched alkyl group e.g. a C4, C5, C6, C7, C8 or C9 branched or unbranched alkyl group.

The alkyl polyglucoside is suitably one where wherein the polyglucoside has a degree of polymerisation (i.e. the average number of glucose units per alkyl group) of from 1 to 15, preferably from 1 to 10, e.g. from 1 to 9, from 1 to 8, from 1 to 7 or from 1 to 6. Typically it may be from 1 to 5 or from 1 to 4; preferably from 1 to 3 or from 1 to 2. Alkyl polyglucosides of particular interest have an average degree of polymerisation of from 1 to 1.5, e.g. from 1.1 to 1.5.

The skilled reader will understand that, due to the method by which they are synthesized, alkyl polyglucosides are generally present as mixtures of alkyl polyglucosides, where there are varying numbers of carbon atoms in the alkyl radical and where there are varying degrees of polymerisation. Thus, when referring to alkyl polyglucosides, the alkyl radical is generally referred to as having a range of carbon atoms, which cover the minimum and maximum length of alkyl carbon chains present in the mixture, and the degree of polymerisation is the average (mean) degree of polymerisation of the mixture.

Synthesis of alkyl polyglucosides is well known and can be found in any text book covering such surfactants, e.g. Alkyl Polyglucosides: Technology, Properties and Applications, eds K Hill, W von Rybinski and G Stoll (Wiley, (1996)).

The water-insoluble organic carrier liquid may suitably be an oil selected from dibasic esters, mineral oils, vegetable oils, paraffinic oils, synthetic oils, and mixtures thereof. In one embodiment, the water-insoluble organic carrier liquid is an oil selected from mineral oils, vegetable oils, paraffinic oils, synthetic oils, and mixtures thereof.

However, other water-insoluble organic carrier liquids can also be contemplated, either alone or in combination with such an oil.

For example, polyvinyl esters (e.g. polyvinyl acetate) and polyolefins such as polybutene (isobutylene-butylene copolymer) may also be contemplated. The polyolefins preferably have a molecular weight in the range of from 100 to 5000 Da, preferably from 100 to 1000 Da or from 100 to 500 Da.

Preferably, if polyvinyl esters (e.g. polyvinyl acetate) and/or polyolefins such as polybutene (isobutylene-butylene copolymer) are used, these are not used as the sole water-insoluble organic carrier liquid. Thus it is preferred that polyvinyl esters and/or polyolefins are only used in combination with another water-insoluble organic carrier liquid, e.g. in combination with one or more oil and/or in combination with one or more viscosity modifiers (such as dibasic acid esters, fatty acid esters or mixtures thereof, as discussed below).

In one embodiment, polyvinyl esters (e.g. polyvinyl acetate) and/or polyolefins such as polybutene (isobutylene-butylene copolymer) are not used or are present in amounts of less than 5% wt/wt, e.g. less than 4%, or less than 3% wt/wt, or less than 2% w/w, e.g. less than 1%, or less than 0.5% wt/wt.

A mixture of liquids is preferred for use as the water-insoluble organic carrier liquid.

The water-insoluble organic carrier liquid may in one embodiment comprise oil (e.g. mineral oil, vegetable oil, paraffinic oil, synthetic oil, or mixtures thereof) diluted with dibasic ester, such as diisobutyl ester of glutaric, succinic or adipic acid; this can improve solvency and solubilisation with the surfactant system.

The water-insoluble organic carrier liquid may alternatively comprise oil (e.g. mineral oil, vegetable oil, paraffinic oil, synthetic oil, or mixtures thereof) diluted with fatty acid ester, such as capryl/caprylic triglycerides (GTCC) or 2-ethyl hexyl oleate. The benefit of using such an ester is that it lowers the pour point of the oil system and serves to improve solvency and solubilisation with the surfactant system.

The water-insoluble organic carrier liquid may alternatively comprise oil (e.g. mineral oil, vegetable oil, paraffinic oil, synthetic oil, or mixtures thereof) diluted with a dibasic ester (such as diisobutyl ester of glutaric, succinic or adipic acid) and with fatty acid ester (such as capryl/caprylic triglycerides (GTCC) or 2-ethyl hexyl oleate). This improves solvency and solubilisation with the surfactant system.

The water-insoluble organic carrier liquid is insoluble in the aqueous phase and droplets of this liquid behave as hydrophobic oils. This hydrophobic oil also facilitates the defoaming action, by forming larger droplets with the surfactant phase.

The oil is released by dilution of the formulation in the fluid system, due to phase behaviour.

The water-insoluble organic carrier liquid is used in an amount of from 2 to 40% w/w of the formulation, e.g. from 3 to 35% w/w. In one preferred embodiment, it is used in an amount of from 5 to 40% w/w, or from 5 to 35% w/w, or from 5 to 30% w/w; e.g. from 5 to 25% w/w or from 5 to 20% w/w. In one embodiment, it is used in an amount of from 6 to 30% w/w, e.g. from 7 to 25% w/w or from 8 to 22% w/w or from 9 to 21% w/w or from 10 to 20% w/w.

In one embodiment, the formulations of the invention are free of silicone or have low silicone content. Therefore it may be that the formulations comprise 5% or less w/w silicone, such as 4% or less w/w, 3% or less w/w, 2% or less w/w, or 1% or less w/w. Suitably, the formulations comprise 0.5% or less w/w silicone, such as 0.1% or less w/w.

The viscosity of the water-insoluble organic carrier liquid may be adjusted to aid the ease of mixing in the formulation. It may be that this is achieved by the addition of viscosity modifiers. These may, for example, be selected from dibasic acid esters, fatty acid esters and mixtures thereof.

Branched fatty acid esters (e.g. pentaerythrityl esters) or unsaturated fatty acid esters (e.g. methyl oleate) are preferred as they have low pour points (<0° C.) and enable the formulations to be stable at temperatures down to −20° C. Dibasic esters such as diisobutyl esters of glutaric, succinic or adipic acids (e.g. RHODIASOLV® DIB, RHODIASOLV® IRIS or RHODIASOLV® RPDE, available from Solvay) are particularly useful as they have relatively low pour points, e.g. as low as −60° C.

In one preferred embodiment, the water-insoluble organic carrier liquid comprises one or more viscosity modifier selected from dibasic acid esters, fatty acid esters and mixtures thereof. These combinations were found to improve the low temperature stability of the microemulsion formulations. Vegetable oils may contain saturated fatty acids and triglycerides, which impart a hazy or opaque appearance as a result of a change in the solubility of the oil components as the temperature is reduced.

Furthermore, it is possible to enhance the defoaming performance of the hydrophobic/oil phase by the use of these esters (dibasic acid esters, fatty acid esters and mixtures thereof) owing to the spreading properties of these esters at the gas/liquid interface compared to oils such as vegetable oils.

These esters typically have lower surface tensions compared to vegetable oils and the like. This can be seen from the following table giving examples of surface tensions.

| Hydrophobic component | Surface tension at 25° C. (mN/m) |
|---|---|
| Vegetable Oil | 34 |
| Disobutyl Adipate | 27.2 |
| Capric/caprylic Triglycerides | 29 |

-continued

| Hydrophobic component | Surface tension at 25° C. (mN/m) |
|---|---|
| 2-Ethylhexyl Nonanoate | 29.7 |
| 2-Ethylhexyl Oleate | 31.2 |

These dibasic acid esters, fatty acid esters and mixtures thereof will also have larger positive initial spreading coefficients (S) compared to vegetable oils and the like, as defined by the Harkins equation (Chapter 4, 'Introduction to Colloid and Surface Chemistry', $5^{th}$ ed, Duncan J Shaw, Butterworth Heinemann). The Harkins equation describes the spreading properties of substances on substrates and is a key requirement for defoamers and antifoams. The Harkins equation is defined by the following expression.

$$S = \gamma W/A - (\gamma O/A + \gamma O/W)$$

where γW/A is the surface tension of the substrate (e.g. water/air), γO/A is the surface tension of the oil phase (oil/air) and γO/W is the interfacial tension of the oil in contact with the substrate, in this case water. For vegetable oils the interfacial tension with water is typically 23-26 mN/m (L R Fisher, E E Mitchell and N S Parker, Journal of Food Science, 1985, 50, 1201-1202) and for a typical ester such as capric/caprylic triglyceride it is approximately 17 mN/m (Crodamol product range data sheet, Croda Chemicals). If water has a surface tension of 72 mN/m at 25° C. it is clearly seen the ester will produce larger spreading coefficient compared to the vegetable oil, i.e. vegetable oils will produce a spreading coefficient of 15 compared to the ester which has a value of 26.

In one embodiment, some of the water-insoluble organic carrier liquid (e.g. 10% or more, 25% or more, 35% or more, 50% or more, 65% or more, 75% or more, or 90% or more, w/w) or all (i.e. 100%, w/w) of the water-insoluble organic carrier liquid is made up of one or more viscosity modifier selected from dibasic acid esters, fatty acid esters and mixtures thereof.

In one embodiment the one or more viscosity modifier (selected from dibasic acid esters, fatty acid esters and mixtures thereof) is present in an amount of from 2 to 40% w/w of the formulation, e.g. from 3 to 35% w/w. In one embodiment, it is used in an amount of from 5 to 40% w/w, or from 5 to 35% w/w, or from 5 to 30% w/w; e.g. from 5 to 25% w/w or from 5 to 20% w/w.

In general, the dibasic acid ester may be an ester of any dicarboxylic acid with any alcohol and the fatty acid ester may be an ester of any fatty acid with any alcohol.

The dibasic acid ester may be an ester of any dicarboxylic acid. The dicarboxylic acid may be straight chain or branched and may be saturated or unsaturated. The dicarboxylic acid may, for example, be a C2-C12 dicarboxylic acid, especially a C3-10 dicarboxylic acid, e.g. a C3-8 dicarboxylic acid. In one embodiment the dicarboxylic acid is a saturated C3-8 dicarboxylic acid, which may be straight chain or branched, such as glutaric acid, succinic acid, adipic acid, 2-methylpentanoic acid, malonic acid, or pimelic acid.

The alcohol used to form the ester may be any suitable monoalcohol or polyol, such as a C1-12 alcohol, especially a C1-10 alcohol, e.g. a C1-8 alcohol. It may, for example, be a sugar alcohol, such as sorbitol or mannitol, or it may be a monohydric alcohol, such as methanol, ethanol, propanol or butanol. The alcohol may be straight chain or it may be branched. In one embodiment the alcohol is a C1-6 monoalcohol, which may be straight chain or branched, such as methanol, ethanol, propanol (e.g., iso-propanol), butanol (e.g. n-butanol or iso-butanol), or is a C2-6 polyol, which may be straight chain or branched, such as sorbitol.

The dibasic acid ester may, for example, be selected from dimethyl, sorbitol or diisobutyl esters of glutaric, succinic or adipic acids.

The fatty acid ester may be an ester of any fatty acid. Where reference is made to a fatty acid in this regard, this is preferably a carboxylic acid with an aliphatic chain that is a C8-30 branched or unbranched alkyl or alkenyl group, such as a C10-22 branched or unbranched alkyl or alkenyl group, or a C11-20 branched or unbranched alkyl or alkenyl group, e.g. a C12-18 branched or unbranched alkyl or alkenyl group. In some embodiments, the aliphatic chain may be a C8-24, or C10-24, or C12-24, branched or unbranched alkyl or alkenyl group. In some embodiments, the aliphatic chain may be a C8-22, or C10-22, or C12-22, branched or unbranched alkyl or alkenyl group. In some embodiments, the aliphatic chain may be a C8-20, or C10-20, or C12-20, branched or unbranched alkyl or alkenyl group. The aliphatic chain may be saturated or unsaturated.

The fatty acid may, for example, be oleic acid, capric acid, caprylic acid, linoleic acid, or lauric acid. Myristic acid, palmitic acid and stearic acid may also be mentioned as examples.

Branched fatty acid esters and/or unsaturated fatty acid esters may be preferred in some embodiments. Thus in some embodiments, the aliphatic chain may be a C8-24 branched alkyl or alkenyl group. In other embodiments the aliphatic chain may be a C8-24 branched or unbranched alkenyl group.

The alcohol used to form the ester may be any suitable monoalcohol or polyol, such as a C1-12 alcohol, especially a C1-10 alcohol, e.g. a C1-8 alcohol. It may be a polyol (including sugar alcohols); for example it may be glycerol or pentaerythritol, or sorbitol or mannitol. It may be a monohydric alcohol, such as methanol, ethanol, propanol, butanol, hexanol or 2-ethyl hexanol. The alcohol may be straight chain or it may be branched. In one embodiment the alcohol is a straight chain or branched C1-8 mono alcohol, such as methanol, ethanol, propanol (e.g., iso-propanol), butanol (e.g. n-butanol or iso-butanol) or 2-ethyl hexanol, or a straight chain or branched C2-8 polyol such as glycerol or pentaerythritol.

In one embodiment, the fatty acid ester is selected from oleic acid esters (e.g. 2-ethyl hexyl oleate or methyl oleate), capric/caprylic triglycerides (GTCC), and pentaerythrityl esters of fatty acids.

Other fatty acid esters that can be mentioned include isopropyl myristate and 2-ethylhexyl nonanoate. Fatty acid esters based on polypropylene glycol ethers could also be contemplated, e.g. PPG-2 myristyl ether propionate.

Branched fatty acid esters (e.g. pentaerythrityl esters) or unsaturated fatty acid esters (e.g. methyl oleate) may be preferred as they have low pour points (<0° C.) and enable the formulations to be stable at temperatures down to −20° C. Dibasic esters such as diisobutyl esters of glutaric, succinic or adipic acids (e.g. RHODIASOLV® DIB, RHODIASOLV® IRIS or RHODIASOLV® RPDE, available from Solvay) are also beneficial options.

Preferably the water-insoluble organic carrier liquid has a viscosity of less than 1000 Pa·s, such as from 1 to 1000 Pa·s or from 1 to 800 Pa·s or from 1 to 600 Pa·s; more preferably it is from 1 to 500 Pa·s. The viscosity may be measured at room temperature using a Brookfield Viscometer.

Any suitable ratio of primary surfactant to water-insoluble organic carrier liquid may be used in the formulations of the invention.

In one embodiment the ratio of primary surfactant to water-insoluble organic carrier liquid is from 10:1 to 0.5:1, e.g. from 8:1 to 0.6:1, preferably from 7:1 to 0.7:1, e.g. from 6:1 to 0.8:1.

In one embodiment the ratio of primary surfactant to water-insoluble organic carrier liquid is from 5:1 to 1:1, e.g. from 4:1 to 1:1, preferably from 3:1 to 1:1, e.g. from 2.5:1 to 1.5:1.

The formulation preferably has a cloud point of from 50 to 90° C. which means that the active ingredients are available to act as defoamers at the operating temperatures of industrial systems such as those in oilfield applications but are less likely to be deposited as particulate material on surfaces in the industrial system. The skilled reader will appreciate that the cloud point (i.e. the temperature at which the material is no longer completely soluble in water, precipitating as a second phase and giving the fluid a cloudy appearance) can be determined using the cloud point test for nonionic surfactants (e.g. ASTM D2024-09). The skilled reader would understand that selection of materials with different cloud points would permit a viable formulation with a cloud point in the desired range to be obtained.

The formulation may optionally include one or more co-surfactants. It may be that these are selected from C6-22 or C6-20 alcohols where the carbon chain is a branched or unbranched alkyl or alkenyl group (e.g. 2-ethyl hexanol), end capped alcohol ethoxylates (e.g. ANTAROX® L330 available from Solvay), acetylenic alcohols, C6-18 fatty acids, lecithins, fatty acid ethoxylates, fatty acid diesters of polyethylene glycol (e.g. PEG 600 dioleate), fatty acid diesters of polypropylene glycol, sorbitan esters and sorbitan ester ethoxylates. They may also be unsaturated C8-C24 fatty alcohols.

Where reference is made to a "fatty" group in this regard, that is preferably a C8-30 unbranched alkyl or alkenyl group, such as a C10-22 unbranched alkyl or alkenyl group, or a C11-20 unbranched alkyl or alkenyl group, e.g. a C12-18 unbranched alkyl or alkenyl group. In some embodiments, the "fatty" group may be a C12-24 unbranched alkyl or alkenyl group.

The formulation may optionally include a co-surfactant that is selected from surfactants with an HLB greater than 11, such as 12 or higher, e.g. from 12 to 20 or from 13 to 18. This co-surfactant may be non-ionic, amphoteric or anionic. In one embodiment this co-surfactant is selected from C6-10 alkyl polyglucosides (e.g. SIMULSOL® SL8 available from Seppic), C6-10 alkyldimethyl betaines, C6-10 alkylamidopropyl betaines (e.g. MACKAM® OCT-50 LS available from Solvay), C6-10 alkyl amphoacetates (e.g. MACKAM® 2CY-75 available from Solvay), Sodium C6-C10 alkyl amphohydroxysulfonate (e.g. MACKAM® JS available from Solvay) or Sodium C8 mixed carboxylates (e.g. MIRANOL® JEM CONC available from Solvay), C6-10 alkyl ampho(di)propionates (e.g. MACKAM® OIP-40 or MACKAM® CY-SF available from Solvay) or C6-10 tertiary amine derivatives such as amine oxides (e.g. MACKAMINE® 654 available from Solvay), acyl sarcosinates and acyl taurates, C8-10 diester and half-ester sulfocuccinates, C8-10 alkyl and alkyl ether sulfates and phosphate esters.

Other co-surfactants that can be mentioned include C8-18 fatty alcohol ethoxylates, e.g. in particular C9-11 alcohol ethoxylates (e.g. RHODASURF® 860P available from Solvay) and iso-decyl alkoxylates (e.g. RHODASURF® DA-630E available from Solvay), C8-18 alkyl polyglucosides (e.g. SIMULSOL® 816 available from Seppic), glyceryl fatty acid esters (e.g. polyglyceryl-3 oleate), fatty acid alkoxylates such as castor oil derivatives (e.g. ALKAMULS® VO/2003 available from Solvay), C8-18 alkyl dimethylamine oxides, C8-18 alkylamidopropyl betaines and hydroxysultaines In one embodiment, the co-surfactant is selected from lecithins, C6-C22 branched alcohols (e.g. 2-ethyl hexanol or isostearyl alcohol), unsaturated C8-C24 fatty alcohols, (e.g. oleyl alcohol), alkyl polyglucosides (e.g. C4-C18 alkyl polyglucosides), C6-C10 phosphate esters, C8-10 alkyl dimethyl and alkyl amidopropyl betaines, C8-C10 alkyl iminopropionates and C8-C10 alkyl amphodipropionates.

Additional co-surfactants may be included in the formulation to adjust the cloud point of the dispersion in the presence of electrolytes such as brines.

Preferred co-surfactants include branched alkoxylates, polyglyceryl esters and alkylpolyglycosides. Alkyl polyglycosides are most preferred because they are considered to be environmentally benign and meet OSPARCOM guidelines for chemicals for offshore use.

A co-surfactant is not essential. When co-surfactant is included it is preferably included in an amount of from 2 to 50% w/w, such as from 5 to 50% w/w, or from 10 to 45% w/w.

In one embodiment, the total amount of surfactant present is 7% w/w or more, such as 10% w/w or more, e.g. 15% w/w or more or 20% w/w or more. It may be from 7 to 80% w/w, such as from 10 to 75% w/w or more, e.g. from 15 to 70% w/w or from 20 to 65% w/w.

In one embodiment, the formulations may have fatty acid included. This is beneficial in that it acts to promote the formation of the antifoam particles when the formulation is added to the brine solution. The "fatty" group may, for example, be a C8-30 unbranched alkyl or alkenyl group, such as a C10-22 unbranched alkyl or alkenyl group, or a C11-20 unbranched alkyl or alkenyl group, e.g. a C12-18 unbranched alkyl or alkenyl group. In some embodiments, the "fatty" group may be a C12-24 unbranched alkyl or alkenyl group.

The surfactants used in the invention can be prepared using conventional methods.

In one embodiment, the ratio of total surfactant (primary surfactant plus co-surfactant) to water-insoluble organic carrier liquid is greater than 0.8:1, greater than 0.9:1 or greater than 1:1. In one embodiment the ratio of total surfactant (primary surfactant plus co-surfactant) to water-insoluble organic carrier liquid is from 15:1 to 1:1, such as from 12:1 to 1:1, preferably from 10:1 to 1:1, e.g. from 9:1 to 1:1.

In one embodiment the ratio of total surfactant to water-insoluble organic carrier liquid is from 8:1 to 1.5:1, e.g. from 7:1 to 2:1.

The formulation may optionally include a water-soluble defoaming additive, which will therefore be present in the aqueous phase of the formulation. Such additives are well known in the art and may, for example, be a C3-12 alkyl glucoside, such as a C4-10 alkyl glucoside, e.g. butyl glucoside (such as SIMULSOL® SL4 available from Seppic). These additives act to improve the rate that foam is destroyed when the formulation is applied to the foam.

The inclusion of a water-soluble defoaming additive is beneficial in that it will be able to suppress the foam without causing secondary problems, such as emulsification or being solubilised by hydrocarbons in the system being treated. Some surfactants may partition preferentially in the non-aqueous phase (loss of efficacy) and there is a potential bioaccumulation risk with surfactants in aquatic organisms.

A water-soluble defoaming additive is not essential. When water-soluble defoaming additive is included it is preferably included in an amount of from 2 to 30% w/w, such as from 3 to 25% w/w, preferably from 5 to 25% w/w, e.g. from 5 to 20% w/w.

The formulation may optionally include a water-soluble coupling agent, which will therefore be present in the aqueous phase of the formulation. Such additives are well known in the art and include dibasic acid amides, e.g. methyl-5-dimethylamino-2-methyloxopentanoate (available as RHODIASOLV® POLACLEAN from Solvay), carbohydrates (e.g. sucrose, glucose, or fructose) and glycol ethers, such as 2-butoxy ethanol (butyl cellosolve). Examples of coupling agents known for use in oilfield applications include glycols, such as ethylene glycol, propylene glycol and butylene glycol, polyols such as glycerol and sorbitol, polyethylene glycols and C1-6 alcohols such as iso-propanol, butanol, ethanol and methanol. Generally, one or more coupling agents may be included to enhance the stability of the formulation at low temperatures.

The coupling agents may purely be used as winterising agents and therefore do not necessarily need to be matched to the surfactant to enhance performance. Glycols, such as propylene glycol, hexylene glycol or polyethylene glycols, are well known to suppress liquid crystalline phase formation by concentrated aqueous solutions of surfactants (e.g. dishwash detergent compositions, as described in US2004/171504A).

A water-soluble coupling agent is not essential. When water-soluble coupling agent is included it is preferably included in an amount of from 0.5 to 15% w/w, such as from 0.5 to 12% w/w, preferably from 1 to 10% w/w, e.g. from 2 to 8% w/w.

The formulation may optionally include a water-soluble or water-dispersable rheology modifying agent. This will therefore be present in the aqueous phase of the formulation. The agent may suitably be a polymer, which may be natural or synthetic. Examples of natural polymers include xanthan gum, guar gums, modified guars, pectin, gum arabic, carageenan, alginates, and modified cellulose (e.g. carboxymethylated or hydroxypropyl cellulose). Synthetic polymers include polyacrylates and hydrophobically modified polyacrylates (e.g. RHEOMER® 33 available from Solvay).

A rheology modifying agent is not essential. When rheology modifying agent is included it is preferably included in an amount of from 0.05 to 3% w/w, such as from 0.05 to 2% w/w, preferably from 0.1 to 1% w/w, e.g. from 0.2 to 0.8% w/w.

The formulation may optionally also include scale inhibitors (or sequestrants), which can prevent or reduce the formation of scale or aid the dissolution of scale. Scale is known to help stabilize foam and therefore it can be beneficial to inhibit scale and/or dissolve scale. Examples of scale inhibitors include polycarboxylates (e.g. polyaspartate), phosphonates, sulfonate polymers and copolymers (e.g. salts of vinyl sulfonic acid, styrene sulfonic acid, alkyloxy-2-hydroxypropylsulfonic acid or acrylamido (methylpropyl) sulfonic acid), succinates, citrates and end capped vinyl copolymers. Hexacyanoferrates, nitrilotrialkanamides and sulfonated polycarboxylate copolymers may also be mentioned.

A scale inhibitor is not essential. When scale inhibitor is included it is preferably included in an amount of from 0.05 to 8% w/w, such as from 0.05 to 6% w/w, preferably from 0.1 to 5% w/w, e.g. from 0.5 to 4% w/w.

The formulation may optionally also include preservatives, which can act to inhibit bacterial or fungal growth. Examples include potassium sorbate, sodium benzoate, benzyl alcohol, dehydroxyacetic acid, phenoxyethanol, parabens, methylchlorothiazolinone, methylisothiazolinone, and carbamates (including iodine derivatives such as iodopropynyl butylcarbamate).

A preservative is not essential. When preservative is included it may be added to the extent required, depending on the environment in which the formulation is to be stored and/or used. It may in one embodiment be included in an amount of from 0.05 to 10% w/w, such as from 0.05 to 5% w/w, preferably from 0.1 to 3% w/w, e.g. from 0.5 to 2% w/w.

The pH of the formulation is suitably from 4 to 8, and preferably from 5 to 7.

In one embodiment, the microemulsion of the present invention is an emulsion whose mean droplet size is less than or equal to about 0.15 µm. The size of the microemulsion droplets may be measured by dynamic light scattering (DLS). This may involve using apparatus such as, for example, a Spectra-Physics 2020 laser, a Brookhaven 2030 correlator and the associated computer-based equipment. If the sample is concentrated, it may be diluted in deionized water and filtered through a 0.22 µm filter to have a final concentration of 2% by weight. The diameter obtained is an apparent diameter. The measurements are taken at angles of 90° and 135°. For the size measurements, besides the standard analysis with cumulents, three exploitations of the autocorrelation function are used (exponential sampling or EXPSAM described by Professor Pike, the "Non Negatively Constrained Least Squares" or NNLS method, and the CONTIN method described by Professor Provencher), which each give a size distribution weighted by the scattered intensity, rather than by the mass or the number. The refractive index and the viscosity of the water are taken into account.

According to one embodiment, the microemulsion is transparent. The microemulsion may have, for example, a transmittance of at least 90% and preferably of at least 95% at a wavelength of 600 nm, for example measured using a Lambda 40 UV-visible spectrometer.

According to another embodiment, the emulsion is an emulsion whose mean droplet size is greater than or equal to 0.15 pm, for example greater than 0.5 pm, or 1 pm, or 2 pm, or 10 pm, or 20 pm, and preferably less than 100 pm. The droplet size may be measured by optical microscopy and/or laser granulometry (Horiba LA-910 laser scattering analyzer).

The foam control formulations of the invention may be used in the same manner as a conventional foam control formulation.

The foam control formulations of the invention may suitably be used to prevent or reduce foam formation in an industrial aqueous system.

The industrial aqueous system may, in one embodiment, be an aqueous system in a hydrocarbon plant; this may be a plant for exploration, recovery, refining or distribution of hydrocarbon. For example, the aqueous system may be an oil or gas plant. In one such embodiment the aqueous system is an oilfield system, such as an oilfield production system or an oilfield distribution system. In another such embodiment the aqueous system is a downstream oil-related system, such as an oil refining system.

The industrial aqueous system may in an alternative embodiment be an aqueous system in a chemical plant, e.g. a chemical manufacturing, processing or distribution plant.

The industrial aqueous system may in another alternative embodiment be a water plant, e.g. an industrial water treatment or distribution system.

The industrial aqueous system may in another alternative embodiment be a paper manufacturing plant.

The aqueous fluid may be flowing or may be stationery. Thus the aqueous fluid may, for example, be in a pipe or other conduit or may be in a tank or other storage container.

Preferably the system is one where there is a high level of agitation. The present invention is particularly beneficial in being able to not only reduce levels of existing foam (partially or fully) but also being able to prevent formation of new foam (partially or fully). This is an important characteristic in systems with a lot of agitation, which are prone to experiencing foam re-forming after the system has been treated with a defoamer.

In one embodiment, the aqueous fluid is at a temperature of 120° C. or less, such as 100° C. or less, e.g. 95° C. or less, such as from 10 to 90° C. or from 20 to 85° C.

The invention will now be further described, in a non limiting manner, with reference to the following Examples:

Examples

A number of formulations were prepared and tested.

The formulations used one or more of the following surfactants as primary surfactant:

| Primary Surfactant | HLB | Cloud Point (° C.) |
|---|---|---|
| ALKAMULS S/20 (ex Solvay) Sorbitan Monolaurate | 8.6 | N/A |
| ALKAMULS S/80 (ex Solvay) Sorbitan Monooleate | 4.3 | N/A |
| ANTAROX 25-R-2 (ex Solvay) EO/PO block copolymer | * | 31-35 (1% aqueous solution) |
| RHODASURF DA 630/E Isodecyl ethoxylate | * | 39-45 (1% aqueous solution) |
| RHODOLINE HP (ex Solvay) Terpene alkoxylate | * | 32-39 (10% aqueous Butyl Diglycol solution) |
| Polyglyceryl-3 Ricinoleate | 4 | N/A |
| Polyglyceryl-3 Oleate | 5 | N/A |
| Polyglyceryl-4 Isostearate | 5 | N/A |
| PEG 600 Dioleate | 10 | N/A |

* in the range of 1-12

The formulations had the following compositions:

| Component | F1 (Wt/Wt %) | F2 (Wt/Wt %) | F3 (Wt/Wt %) | F4 (Wt/Wt %) |
|---|---|---|---|---|
| ANTAROX 25-R-2 (100%) EO/PO block copolymer | 18.7 | — | 18.6 | — |
| RHODOLINE HP (100%) Terpene alkoxylate (SOLVAY) | — | 19.6 | — | 19.7 |
| RHODASURF DA 630/E (100%) Iso-decyl alcohol ethoxylate (SOLVAY) | 36.3 | 33.4 | 36.8 | 33.1 |
| RHODISOLV DIB (100%) Diisobuytyl adipate (SOLVAY) | 6.7 | 7.0 | 6.7 | 7.1 |
| Rapeseed Oil (100%) (KERFOOTS) | 2.2 | 2.3 | 2.2 | 2.4 |
| NAFOL 810 (100%) C8-10 fatty alcohol (SASOL) | — | — | 1.9 | — |
| 2-Ethyl Hexanol | 3.7 | 3.9 | — | — |
| SIMULSOL SL4 (50%) Butyl Glucoside (SEPPIC) | — | — | 3.7 | 7.9 |
| Ethylene Glycol Mono n-Butyl Ether - EGMBE | 3.7 | 3.9 | 3.7 | 3.9 |
| Water | 28.7 | 29.9 | 26.4 | 25.9 |
| Viscosity (Brookfield LVT, Spindle S63, 20 rpm at 20° C.) | 64.8 cps | 48 cps | 72 cps | 55 cps |
| pH (1% aqueous at 20° C.) | 5.44 | 5.94 | 5.68 | 5.51 |

| Component | F5 (Wt/Wt %) | F6 (Wt/Wt %) | F7 (Wt/Wt %) | F8 (Wt/Wt %) |
|---|---|---|---|---|
| RHODOLINE HP (100%) Terpene alkoxylate (SOLVAY) | 19.7 | — | — | — |
| RHODASURF DA 630/E Iso-decyl alcohol ethoxylate (SOLVAY) | 33.0 | — | — | — |
| Polyglyceryl-3 Oleate (100%) (ESTERCHEM) | — | 19 | 17.0 | 18.0 |
| RHODIASOLV DIB (100%) Diisobuytyl Adipate (SOLVAY) | 7.1 | — | — | — |
| RHODIASOLV IRIS (100%) dimethyl 2-methylpentanedioate (SOLVAY) | — | 9.0 | 8.5 | 9.0 |
| ALKAMULS T/20 (100%) POE 20 Sorbitan Laurate (SOLVAY) | — | 26.0 | 32.0 | 26 |
| Rapeseed Oil (100%) (KERFOOOTS) | 2.4 | 4.0 | 4.0 | 5.0 |
| NOVOL Oleyl Alcohol (100%) (CRODA) | 3.9 | — | — | — |
| NAFOL 810 (100%) C8-10 alcohol (SASOL) | — | 5.0 | 9.0 | 5.0 |
| Ethylene Glycol Mono n-Butyl Ether - EGMBE | — | 5.0 | — | — |
| Mono Ethylene Glycol (100%) | 3.9 | — | 5.0 | 5.0 |
| SIMULSOL SL4 (50%) Butyl Glucoside (SEPPIC) | — | — | — | 5.0 |
| Water | 33.9 | 32.0 | 24.5 | 27.0 |
| Viscosity (Brookfield LVT, Spindle S63, 20 rpm at 20° C.) | 65 cps | 58 cps | 48 cps | 52 cps |
| pH (1% aqueous at 20° C.) | 5.62 | 5.81 | 5.75 | 5.60 |

| Component | F9 (Wt/Wt %) | F10 (Wt/Wt %) |
|---|---|---|
| Polyglyceryl-3 Oleate (100%) (ESTERCHEM) | 18.0 | 16.0 |
| RHODIASOLV IRIS (100%) dimethyl 2-methylpentanedioate (SOLVAY) | 9.0 | 8.0 |
| ALKAMULS T/20 (100%) POE 20 sorbitan laurate (SOLVAY) | 26.0 | 31.0 |
| Rapeseed Oil (100%) (KERFOOTS) | 4.0 | 4.0 |
| NAFOL 810 (100%) C8-10 alcohol (SASOL) | 5.0 | 10.0 |
| Ethylene Glycol Mono n-Butyl Ether - EGMBE | 5.0 | — |
| Mono Ethylene Glycol (100%) | — | 5.0 |
| SIMULSOL SL4 (50%) Butyl Glucoside (SEPPIC) | 5.0 | 5.0 |
| Water | 28.0 | 21.0 |
| Viscosity (Brookfield LVT, Spindle S63, 20 rpm at 20° C.) | 70 | 60 |
| pH (1% aqueous solution) | 5.8 | 6.0 |

| Component | F11 (Wt/Wt %) | F12 (Wt/Wt %) | F13 (Wt/Wt %) | F14 (Wt/Wt %) |
|---|---|---|---|---|
| PEG 600 Dioleate (100%) (ESTERCHEM) | 11.0 | — | 9.0 | 12.0 |
| ALKAMULS S/80 (100%) Sorbitan monooleate (SOLVAY) | — | 7.0 | — | — |
| RHODIASOL DIB (100%) Diisobutyl adipate (SOLVAY) | 9.0 | 8.0 | 9.0 | 8.0 |
| 2-Ethyl Hexyl Oleate (100%) (ESTERCHEM) | 14.0 | 16.0 | 16.5 | 10.0 |
| Rapeseed Oil (100%) (KERFOOTS) | — | — | — | 10.0 |
| RADIACID O116 (100%) Oleic Acid (OLEON) | 10.0 | 7.0 | 8.5 | 4.0 |
| ALAKAMULS T/20 (100%) POE(20) sorbitan laurate (SOLVAY) | 13.0 | 18.0 | — | — |
| ANTAROX 3008 (100%) Glycerol alkoxylate (80% PO and 20% EO) | — | — | 12.5 | 12.5 |
| 2-Ethyl Hexanol | 9.0 | 7.0 | 9.5 | 8.5 |
| Ethylene Glycol Mono n-Butyl Ether - EGMBE | 6.0 | — | 8.0 | 8.0 |
| RHODIASOLV POLARCLEAN (100%) methyl-5-dimethylamino-2-methyloxopentanoate (SOLVAY) | — | 7.0 | — | — |
| KOH (50%) | 2.0 | 1.3 | 1.5 | 0.8 |
| Water | 25.0 | 28.7 | 25.5 | 26.2 |
| Viscosity (Brookfield LVT, Spindle S63, 20 rpm at 20° C.) | 78 cps | 168 cps | 323 cps | 395.8 cps |
| pH (1% aqueous solution) | 8.5 | 8.4 | 8.6 | 8.2 |

| Component | F15 (Wt/Wt %) | F16 (Wt/Wt %) | F17 (Wt/Wt %) | F18 (Wt/Wt %) |
|---|---|---|---|---|
| ALKAMULS S/20 (100%) Sorbitan Monolaurate (SOLVAY) | — | 17.0 | — | — |
| ALKAMULS T/20 (100%) POE 20 Sorbitan Monolaurate (SOLVAY) | 11.0 | — | — | — |
| ALKAMULS EL 719-E (100%) Castor Oil Ethoxylate (SOLVAY) | — | 15.0 | 14.0 | 14.0 |
| DURAPHOS 2-EHAPE (100%) 2-Ethyl Hexyl Phosphate Ester (SOLVAY) | 8.0 | — | — | — |
| RHODIASOLV DIB (100%) Diisobutyl adipate (SOLVAY) | 7.0 | — | — | — |
| RHODIASOLV IRIS (100%) dimethyl 2-methylpentanedioate (SOLVAY) | — | — | 9.0 | 4.0 |
| 2-Ethyl Hexyl Oleate (100%) (ESTERCHEM) | 3.0 | 5.5 | — | — |
| Rapeseed Oil (100%) (KERFOOTS) | 18.0 | 20.0 | 17.0 | 16.0 |
| NOVOL (100%) Oleyl Alcohol (CRODA) | — | — | 9.0 | 10.0 |
| RADIACID O116 (100%) Oleic Acid (OLEON) | 6.5 | 5.0 | 10.0 | 13.0 |
| NAFOL 1012 (100%) C10/12 Fatty Alcohol (SASOL) | — | 5.0 | — | — |
| TEXTROL CA (66%) SoyLecithin (SOLAE) | 4.0 | — | 13.5 | 14.0 |
| 2-Ethyl Hexanol | 7.0 | 5.5 | — | — |
| Ethylene Glycol Mono n-Butyl Ether (EGMBE) | — | 5.0 | — | — |
| RHODIASOLV POLARCLEAN (100%) methyl-5-dimethylamino-2-methyloxopentanoate (SOLVAY) | 5.0 | — | 8.5 | 8.0 |
| KOH (50%) | 4.0 | 0.8 | 1.5 | 2.0 |
| Water | 26.5 | 22.0 | 17.5 | 19.0 |
| Viscosity (Brookfield LVT, Spindle S63, 20 rpm at 20° C.) | 84 cps | 90 cps | 198 cps | 293.9 cps |
| pH (1% aqueous solution) | 7.8 | 8.0 | 8.1 | 8.6 |

The formulations were prepared using the following procedure:
i) Charge primary surfactant(s) to a clean beaker. Heat contents if required to melt any solids or pastes. Surfactant mixture should be heated to 40 to 50° C. to avoid gelling of the product as it is processed.
ii) Add the dibasic ester/fatty acid ester/oil components. Mix until a homogeneous suspension is obtained.
iii) Add co-surfactant and mix until homogeneous. Surfactants containing water may produce a liquid crystalline dispersion (lamellar phase). Cool mixture to 40 to 50° C.

iv) Add 25% of the water charge to the mixture and mix until a homogeneous composition is obtained.

v) Add coupling agent and mix until homogeneous.

vi) Add remaining water charge and water soluble defoamer (if required). Solution may contain a pre-dispersed polymer to modify the rheology.

vii) Add scale inhibitor (if required).

viii) Cool solution to ambient temperature and add preservative if required.

ix) Check water content and pH. Adjust into specification (if required).

Dynamic Foam Tests

The performance of the microemulsions was benchmarked against commercial defoamer/antifoam products using a dynamic foam test apparatus. The equipment comprised a jacketed 1000 ml cylinder with graduations and a gas sparge tube (No 2 frit). The gas sparge tube was connected to a flow meter rated for use at a gas pressure of 20 psi. A model brine and hydrocarbon mixture (200 ml) was used to simulate production fluids at 50° C. The brine/oil ratio (v/v) was 90/10 and the mixture was comprised of 5% w/w NaCl or 5% w/w NaCl/1% w/w $CaCl_2$ and Isopar M respectively. An amphoteric surfactant, lauramidopropyl hydroxysultaine (MACKAM LSB-50 from Solvay) was used as the foaming agent for the tests.

The brine and hydrocarbon mixture was allowed to equilibrate at 50° C. before 5000 ppm a.i amphoteric surfactant was introduced at the top of the apparatus using a dropping pipette. The solution was sparged with 0.5 l/min of nitrogen gas and the foam volume was allowed to increase until it reached a height of 400 ml in the measuring cylinder. The gas was turned off and the defoamer (500-5000 ppm) added using a pipette onto the foam. The foam decay rate was monitored for a period of up to five minutes in order to assess the defoaming performance of the formulation.

When the allotted time period had passed, nitrogen gas (0.5 l/min) was re-introduced to create more foam. The foam volume was allowed to increase to 300 ml before turning off the gas supply. The foam decay rate was then monitored for a further period of time (five minutes maximum). This test was used to assess the antifoam performance of the formulation.

Defoaming and antifoam performance of the microemulsion formulations were benchmarked against two commercially available antifoams—'silicone free' hydrophobic solid/oil dispersion and a silicone o/w emulsion—used to control foam in oilfield applications. The products were used as supplied.

Results

Formulations F1-F10

The following results were obtained for the defoamer formulations in 5% w/w NaCl or 5% w/w NaCl and 1% w/w $CaCl_2$ respectively at 50° C.

The defoamer performance was compared to the foam decay rate of 5000 ppm surfactant (blank).

The foam volumes measured were corrected for the volume of liquid in the column, i.e. 200 ml.

Foam volume=Foam height (ml)−liquid volume (ml).

Dynamic Foam Test Results for 5% NaCl Brine at 50° C.

1000 ppm W/O Microemulsion—Defoaming Performance

| Formulation | Foam Volume (ml) | | | | | | | |
|---|---|---|---|---|---|---|---|---|
| | 0 s | 5 s | 10 s | 20 s | 30 s | 60 s | 120 s | 180 s |
| Blank - no antifoam | 200 | 190 | 180 | 170 | 160 | 120 | 70 | 50 |
| Silicone antifoam | 200 | 30 | 20 | 0 | 0 | 0 | 0 | 0 |
| Solid/oil antifoam | 200 | 150 | 120 | 90 | 80 | 80 | 50 | 30 |
| F1 | 200 | 140 | 110 | 60 | 30 | 20 | 0 | 0 |
| F2 | 200 | 120 | 100 | 80 | 50 | 10 | 0 | 0 |
| F3 | 200 | 150 | 130 | 90 | 50 | 10 | 0 | 0 |
| F4 | 200 | 180 | 150 | 90 | 60 | 0 | 0 | 0 |

1000 ppm W/O Microemulsion—Antifoam Performance

| Formulation | Foam Volume (ml) | | | | | | | |
|---|---|---|---|---|---|---|---|---|
| | 0 s | 5 s | 10 s | 20 s | 30 s | 60 s | 120 s | 180 s |
| Silicone antifoam | 100 | 20 | 10 | 0 | 0 | 0 | 0 | 0 |
| Solid/oil antifoam | 100 | 90 | 80 | 70 | 60 | 60 | 60 | 50 |
| F1 | 100 | 80 | 70 | 50 | 40 | 30 | 10 | 0 |
| F2 | 100 | 80 | 80 | 70 | 60 | 50 | 40 | 30 |
| F3 | 100 | 80 | 60 | 50 | 40 | 30 | 30 | 20 |
| F4 | 100 | 90 | 90 | 80 | 70 | 50 | 50 | 30 |

5000 ppm W/O Microemulsion—Defoaming Performance

| Formulation | Foam Volume (ml) | | | | | | | |
|---|---|---|---|---|---|---|---|---|
| | 0 s | 5 s | 10 s | 20 s | 30 s | 60 s | 120 s | 180 s |
| Blank - no antifoam | 200 | 190 | 180 | 170 | 160 | 120 | 70 | 50 |
| Silicone Antifoam | 200 | 20 | 10 | 0 | 0 | 0 | 0 | 0 |
| Solid/oil Antifoam | 200 | 140 | 100 | 80 | 70 | 60 | 20 | 20 |
| F1 | 200 | 120 | 80 | 40 | 15 | 0 | 0 | 0 |
| F2 | 200 | 110 | 90 | 40 | 10 | 0 | 0 | 0 |
| F3 | 200 | 120 | 100 | 70 | 30 | 0 | 0 | 0 |
| F4 | 200 | 140 | 110 | 70 | 30 | 0 | 0 | 0 |
| F5 | 200 | 160 | 135 | 85 | 45 | 10 | 0 | 0 |
| F6 | 200 | 140 | 120 | 100 | 85 | 40 | 20 | 10 |
| F7 | 200 | 180 | 160 | 100 | 80 | 40 | 20 | 10 |
| F8 | 200 | 150 | 130 | 110 | 60 | 30 | 10 | 0 |
| F9 | 200 | 110 | 80 | 50 | 40 | 20 | 10 | 0 |
| F10 | 200 | 170 | 150 | 120 | 110 | 50 | 10 | 0 |

5000 ppm W/O Microemulsion—Antifoam Performance

| Formulation | Foam Volume (ml) | | | | | | | |
|---|---|---|---|---|---|---|---|---|
| | 0 s | 5 s | 10 s | 20 s | 30 s | 60 s | 120 s | 180 s |
| Silicone Antifoam | 100 | 30 | 20 | 0 | 0 | 0 | 0 | 0 |
| Solid/oil Antifoam | 100 | 85 | 80 | 70 | 60 | 60 | 60 | 50 |
| F1 | 100 | 70 | 50 | 30 | 10 | 0 | 0 | 0 |
| F2 | 100 | 80 | 60 | 40 | 20 | 0 | 0 | 0 |
| F3 | 100 | 70 | 60 | 40 | 20 | 0 | 0 | 0 |
| F4 | 100 | 80 | 70 | 50 | 30 | 0 | 0 | 0 |
| F5 | 100 | 85 | 50 | 30 | 20 | 10 | 0 | 0 |
| F6 | 100 | 85 | 80 | 65 | 55 | 45 | 35 | 20 |
| F7 | 100 | 90 | 85 | 70 | 55 | 50 | 40 | 30 |

-continued

| Formulation | \multicolumn{8}{c}{Foam Volume (ml)} | | | | | | | |
|---|---|---|---|---|---|---|---|---|
| | 0 s | 5 s | 10 s | 20 s | 30 s | 60 s | 120 s | 180 s |
| F8 | 100 | 90 | 80 | 60 | 50 | 40 | 35 | 30 |
| F9 | 100 | 80 | 70 | 60 | 50 | 40 | 30 | 20 |
| F10 | 100 | 85 | 70 | 60 | 50 | 40 | 30 | 20 |

Formulations F11-F18

Defoamer performance was benchmarked in a 5% w/w NaCl and 1% w/w CaCl$_2$ brine at 50° C. Foam decay rates were compared against the silicone antifoam and against the previously tested F1.

1000 ppm W/O Microemulsion—Defoaming Performance

| Formulation | Foam Volume (ml) | | | | | | | |
|---|---|---|---|---|---|---|---|---|
| | 0 s | 5 s | 10 s | 20 s | 30 s | 60 s | 120 s | 180 s |
| Blank - no antifoam | 200 | 190 | 190 | 180 | 170 | 140 | 120 | 120 |
| Silicone Antifoam | 200 | 40 | 20 | 0 | 0 | 0 | 0 | 0 |
| F1 | 200 | 60 | 50 | 30 | 20 | 10 | 0 | 0 |
| F11 | 200 | 120 | 100 | 80 | 50 | 30 | 30 | 20 |
| F12 | 200 | 160 | 140 | 120 | 100 | 50 | 40 | 40 |
| F13 | 200 | 80 | 60 | 30 | 20 | 20 | 20 | 20 |
| F14 | 200 | 60 | 40 | 30 | 20 | 20 | 10 | 10 |
| F15 | 200 | 60 | 60 | 50 | 40 | 20 | 20 | 20 |
| F16 | 200 | 100 | 80 | 60 | 40 | 10 | 10 | 10 |
| F17 | 200 | 180 | 160 | 120 | 90 | 20 | 20 | 10 |
| F18 | 200 | 140 | 120 | 100 | 50 | 10 | 10 | 10 |

1000 ppm W/O Microemulsion—Antifoam Performance

| Formulation | Foam Volume (ml) | | | | | | | |
|---|---|---|---|---|---|---|---|---|
| | 0 s | 5 s | 10 s | 20 s | 30 s | 60 s | 120 s | 180 s |
| Silicone Antifoam | 100 | 20 | 20 | 0 | 0 | 0 | 0 | 0 |
| F1 | 100 | 60 | 40 | 20 | 20 | 20 | 20 | 20 |
| F11 | 100 | 80 | 70 | 70 | 70 | 40 | 30 | 30 |
| F12 | 100 | 90 | 90 | 80 | 80 | 60 | 50 | 50 |
| F13 | 100 | 100 | 100 | 90 | 80 | 80 | 70 | 70 |
| F14 | 100 | 60 | 40 | 20 | 10 | 10 | 10 | 10 |
| F15 | 100 | 80 | 80 | 60 | 50 | 40 | 40 | 30 |
| F16 | 100 | 80 | 70 | 60 | 50 | 30 | 30 | 30 |
| F17 | 100 | 90 | 80 | 80 | 70 | 50 | 30 | 20 |
| F18 | 100 | 80 | 70 | 60 | 40 | 20 | 20 | 20 |

5000 ppm W/O Microemulsion—Defoaming Performance

| Formulation | Foam Volume (ml) | | | | | | | |
|---|---|---|---|---|---|---|---|---|
| | 0 s | 5 s | 10 s | 20 s | 30 s | 60 s | 120 s | 180 s |
| Blank - no antifoam | 200 | 190 | 190 | 180 | 170 | 140 | 120 | 120 |
| Silicone Antifoam | 200 | 30 | 10 | 0 | 0 | 0 | 0 | 0 |
| F1 | 200 | 120 | 80 | 40 | 15 | 0 | 0 | 0 |
| F11 | 200 | 70 | 50 | 20 | 20 | 20 | 20 | 10 |
| F12 | 200 | 60 | 50 | 20 | 20 | 20 | 20 | 10 |
| F13 | 200 | 20 | 20 | 20 | 10 | 0 | 0 | 0 |
| F14 | 200 | 90 | 80 | 40 | 20 | 10 | 0 | 0 |
| F15 | 200 | 100 | 80 | 80 | 20 | 10 | 0 | 0 |
| F16 | 200 | 110 | 100 | 80 | 60 | 20 | 10 | 10 |
| F17 | 200 | 80 | 60 | 30 | 30 | 20 | 10 | 10 |
| F18 | 200 | 100 | 50 | 40 | 10 | 10 | 0 | 0 |

5000 ppm W/O Microemulsion—Antifoam Performance

| Formulation | Foam Volume (ml) | | | | | | | |
|---|---|---|---|---|---|---|---|---|
| | 0 s | 5 s | 10 s | 20 s | 30 s | 60 s | 120 s | 180 s |
| Silicone Antifoam | 100 | 20 | 10 | 0 | 0 | 0 | 0 | 0 |
| F1 | 100 | 70 | 40 | 30 | 10 | 0 | 0 | 0 |
| F11 | 100 | 70 | 60 | 50 | 40 | 30 | 20 | 20 |
| F12 | 100 | 60 | 60 | 60 | 50 | 30 | 20 | 20 |
| F13 | 100 | 60 | 30 | 20 | 20 | 0 | 0 | 0 |
| F14 | 100 | 60 | 50 | 30 | 30 | 10 | 10 | 0 |
| F15 | 100 | 60 | 50 | 20 | 20 | 20 | 20 | 10 |
| F16 | 100 | 80 | 50 | 40 | 40 | 10 | 10 | 10 |
| F17 | 100 | 70 | 70 | 40 | 20 | 10 | 10 | 10 |
| F18 | 100 | 80 | 60 | 30 | 10 | 10 | 10 | 0 |

Stability Tests

Samples of the microemulsion formulations were stored at −5° C., 5° C., ambient temperature and 40° C. for a period of one month.

Formulations that remained low viscosity dispersions at low temperature and did not separate on storage at each respective temperature were assessed as being suitable for use. Microemulsion formulations which became translucent or opaque at low temperature, did not separate into distinct layers and cleared on heating to ambient temperatures were also characterised as being stable. The opacity observed was attributed to the presence of saturated fatty acids (vegetable oils) and fatty alcohols present in the formulation.

The microemulsions were also subjected to freeze/thaw tests to determine whether the formulations would separate or not.

Results

The storage test results are given in the following tables for selected formulations.

| Storage Conditions | Solid/Oil Dispersion | Silicone O/W Antifoam | F1 | F2 | F3 |
|---|---|---|---|---|---|
| −5° C. after 4 weeks | Viscous liquid/solid mixture | Viscous liquid had separated into two layers | Clear low viscosity liquid | Clear low viscosity liquid | Clear low viscosity liquid |
| 5° C. after 4 weeks | Viscous liquid exhibiting signs of separation | Viscous liquid had separated into two layers | Clear low viscosity liquid | Clear low viscosity liquid | Clear low viscosity liquid |
| Ambient (20° C.) after 4 weeks | Viscous liquid. Separated into two layers | Dispersion had separated into two layers | Clear low viscosity liquid | Clear low viscosity liquid | Clear low viscosity liquid |

-continued

| Storage Conditions | Solid/Oil Dispersion | Silicone O/W Antifoam | F1 | F2 | F3 |
|---|---|---|---|---|---|
| 40° C. after 4 weeks | Dispersion had separated into two layers | Dispersion had separated into two layers | Clear low viscosity liquid | Clear low viscosity liquid | Clear low viscosity liquid |
| Appearance after 5 freeze/thaw cycles | Dispersion had separated into two layers | Dispersion had separated into two layers | Clear low viscosity liquid | Clear low viscosity liquid | Clear low viscosity liquid |

| Storage Conditions | F4 | F5 | F6 | F7 | F8 |
|---|---|---|---|---|---|
| −5° C. after 4 weeks | Hazy/translucent low viscosity liquid | Hazy/translucent low viscosity liquid | Hazy/translucent low viscosity dispersion | Hazy/translucent low viscosity dispersion | Hazy/translucent low viscosity dispersion |
| 5° C. after 4 weeks | Hazy/translucent low viscosity liquid | Hazy/translucent low viscosity liquid Clear low viscosity liquid | Hazy/translucent low viscosity dispersion | Hazy/translucent low viscosity dispersion | Hazy/translucent low viscosity dispersion |
| Ambient (20° C.) after 4 weeks | Clear low viscosity liquid | Clear low viscosity liquid | Clear amber clear liquid | Clear amber clear liquid | Clear amber clear liquid |
| 40° C. after 4 weeks | Clear low viscosity liquid | Clear low viscosity liquid | Clear amber clear liquid | Clear amber clear liquid | Clear amber clear liquid |
| Appearance after 5 freeze/thaw cycles | Clear low viscosity liquid | Clear low viscosity liquid | Clear amber clear liquid | Clear amber clear liquid | Clear amber clear liquid |

| Storage Conditions | F11 | F12 | F13 | F14 | F15 |
|---|---|---|---|---|---|
| −5° C. after 4 weeks | Hazy/translucent low viscosity dispersion | Hazy/translucent low viscosity dispersion | Hazy/translucent low viscosity dispersion | Low viscosity, translucent/hazy liquid. | Low viscosity, clear liquid |
| 5° C. after 4 weeks | Hazy/translucent low viscosity dispersion | Hazy/translucent low viscosity dispersion | Hazy/translucent low viscosity dispersion | Low viscosity, translucent/hazy liquid. | Low viscosity, clear liquid |
| Ambient (20° C.) after 4 weeks | Dark amber clear liquid | Dark amber clear liquid | Dark amber clear liquid | Dark amber clear liquid | Dark amber clear liquid |
| 40° C. after 4 weeks | Dark amber clear liquid | Dark amber clear liquid | Dark amber clear liquid | Dark amber clear liquid | Dark amber clear liquid |
| Freeze/thaw (5 cycles) | Dark amber clear liquid | Dark amber clear liquid | Dark amber clear liquid | Dark amber clear liquid | Dark amber clear liquid |

| Storage Conditions | F16 | F17 | F18 |
|---|---|---|---|
| −5° C. after 4 weeks | Low viscosity, translucent/hazy liquid. | Viscous hazy dispersion. Slight precipitate (fatty acids). | Viscous hazy dispersion. Slight precipitate (fatty acids). |
| 5° C. after 4 weeks | Low viscosity, translucent/hazy liquid. | Viscous hazy dispersion | Viscous hazy dispersion |
| Ambient (20° C.) after 4 weeks | Dark amber clear liquid | Dark amber clear liquid | Dark amber clear liquid |
| 40° C. after 4 weeks | Dark amber clear liquid | Dark amber clear liquid | Dark amber clear liquid |
| Freeze/thaw (5 cycles) | Dark amber clear liquid | Dark amber clear liquid | Dark amber clear liquid |

The hazy/translucent appearance observed at low temperature was attributed to the presence of trace amounts of saturated fatty acids and high molecular weight fatty alcohols present in the raw materials.

Discussion

The microemulsion formulations of the invention were found to be effective defoamers. The microemulsion formulations of the invention also had an adequate antifoam performance.

The microemulsions were found to remove 80-90% of the foam generated in less than sixty seconds.

The microemulsion formulations of the invention were found to be very stable, across a wide temperature range. They were also very easy to manufacture.

It is highly unlikely the formulations of the invention would persist in downstream operations, i.e. refining. They are also more benign to the environment; the majority of the components in the formulations are biodegradable.

The formulations are also they are non-depositing (do not contain solids).

Further, it is relatively easy to adapt the formulation, demonstrating the flexibility of the technology. For example, the formulations may have fatty acid included to promote the formation of the antifoam particles when the formulation is added to the brine solution.

The formulations were also found to be more effective defoamers and antifoams compared to the commercial solid/oil antifoam used to benchmark the performance.

Accordingly, it is clear that the formulations of the invention are low viscosity dispersions and are stable over a wide temperature range compared to commercial antifoams. The formulations have a clear or translucent appearance and are concentrated dispersions of surfactants and hydrophobic liquids. The formulations exhibited moderate to good antifoam performance and very effective de-foaming performance.

Overall, the formulations of the invention provide a combination of properties that is highly desirable; in particular the invention permits the provision of stable, low viscosity products, which can therefore be easily injected into fluid environments and therefore are straightforward to disperse effectively, which are highly effective at de-foaming and also have an anti-foaming effect.

The invention claimed is:

1. A product which is a foam control formulation in the form of a micro emulsion, the formulation comprising:
   (a) from 5 to 70% w/w of primary surfactant, said surfactant having an HLB of from 1 to 12 and/or a cloud point of from 20 to 70° C.; wherein the primary surfactant is selected from the group consisting of alkoxylated alcohols, alkoxylated terpenes, block copolymers of alkoxylates, fatty alkanolamides, fatty alkanolamines, carboxylic acid esters of alcohols that are the reaction products of a C1-8 monocarboxylic acid with a C2-C20 polyol; sorbitan fatty acid esters, polyglycerol fatty acid esters, polyethylene glycol fatty acid esters, alkoxylated fatty acids, and alkyl polyglucosides;
   (b) from 2 to 40% w/w of water-insoluble organic carrier liquid, wherein the water-insoluble organic carrier liquid comprises a vegetable oil and a viscosity modifier selected from dibasic acid esters, fatty acid esters of C1-8 monoalcohols; capric/caprylic triglycerides, pentaerythrityl fatty acid esters, and mixtures thereof; and
   (c) water.

2. A method of preparing said foam control formulation as defined in claim 1, the method comprising:
   (a) providing primary surfactant, said surfactant having an HLB of from 1 to 12 and/or a cloud point of from 20 to 70° C.; wherein the primary surfactant is selected from the group consisting of alkoxylated alcohols, alkoxylated terpenes, block copolymers of alkoxylates, fatty alkanolamides, fatty alkanolamines, carboxylic acid esters of alcohols that are the reaction products of a C1-8 monocarboxylic acid with a C2-C20 polyol; sorbitan fatty acid esters, polyglycerol fatty acid esters, polyethylene glycol fatty acid esters, alkoxylated fatty acids, and alkyl polyglucosides;
   (b) providing water-insoluble organic carrier liquid, wherein the water-insoluble organic carrier liquid comprises a vegetable oil and a viscosity modifier selected from dibasic acid esters, fatty acid esters of C1-8 monoalcohols; capric/caprylic triglycerides, pentaerythrityl fatty acid esters, and mixtures thereof; and
   (c) combining the primary surfactant and the water-insoluble organic carrier liquid with water and then mixing or stirring to provide a formulation in the form of a micro emulsion.

3. A method of preventing or reducing foam in a fluid system, the method comprising:
   (a) providing said formulation according to claim 1; and
   (b) adding the formulation to the fluid system.

4. The method of claim 3 wherein the system is one where there is a high degree of agitation.

5. The method of claim 3 wherein the system is an aqueous fluid system.

6. The method of claim 3 wherein the system is an oilfield system.

7. A method for preventing and reducing foam in a fluid system, the method comprising:
   (a) providing said formulation according to claim 1; and
   (b) adding the formulation to the fluid system.

8. A method for controlling foam production in a fluid system, the method comprising:
   (a) providing said formulation according to claim 1 as a processing aid; and
   (b) adding the formulation to the fluid system.

9. The product of claim 1 wherein 25% or more w/w of the water insoluble organic carrier liquid is made up of one or more viscosity modifier selected from dibasic acid esters, fatty acid esters of C1-8 monoalcohols; capric/caprylic triglycerides, pentaerythrityl fatty acid esters, and mixtures thereof.

10. The product of claim 1 wherein the dibasic acid ester is an ester formed from a C2-C12 dicarboxylic acid and a C1-12 alcohol.

11. The product of claim 1 wherein the primary surfactant has an HLB of from 1 to 12 and if this surfactant has a cloud point, the cloud point is from 20 to 70° C.

12. The product of claim 1 wherein the formulation includes one or more of:
   co-surfactant;
   water-soluble defoaming additive;
   water-soluble coupling agent;
   water-soluble or water-dispersable rheology modifying agents;
   scale inhibitors;
   preservatives.

13. The product of claim 1 wherein the formulation has a pH of from 5 to 7.

14. The product of claim 1 wherein the formulation comprises a fatty acid.

15. The product of claim 1 wherein the ratio of primary surfactant to water-insoluble organic carrier liquid is from 10:1 to 0.5:1.

16. The product of claim 1 wherein the total amount of surfactant present is from 7 to 80% w/w.

17. The product of claim 1 wherein the ratio of total surfactant to water-insoluble organic carrier liquid is greater than 1:1.

18. The product of claim 1, wherein the vegetable oil is rapeseed oil.

19. A product which is a precursor to a foam control formulation in the form of a micro emulsion, the precursor comprising:
   (a) primary surfactant, said surfactant having an HLB of from 1 to 12 and/or a cloud point of from 20 to 70° C.; wherein the primary surfactant is selected from the group consisting of alkoxylated alcohols, alkoxylated terpenes, block copolymers of alkoxylates, fatty alkanolamides, fatty alkanolamines, carboxylic acid esters of alcohols that are the reaction products of a C1-8 monocarboxylic acid with a C2-C20 polyol; sorbitan fatty acid esters, polyglycerol fatty acid esters, polyethylene glycol fatty acid esters, alkoxylated fatty acids, and alkyl polyglucosides; and
   (b) water-insoluble organic carrier liquid, wherein said water-insoluble organic carrier liquid comprises a vegetable oil and a viscosity modifier selected from: dibasic acid esters, fatty acid esters of C1-8 monoalcohols; capric/caprylic triglycerides, pentaerythrityl fatty acid esters and mixtures thereof.

* * * * *